US006419820B1

(12) United States Patent
Bogdan et al.

(10) Patent No.: US 6,419,820 B1
(45) Date of Patent: Jul. 16, 2002

(54) CATALYTIC REFORMING PROCESS EMPLOYING A SELECTIVE BIFUNCTIONAL MULTIGRADIENT MULTIMETALLIC CATALYST

(75) Inventors: Paula L. Bogdan, Mount Prospect; Maureen L. Bricker, Buffalo Grove, both of IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 09/312,869

(22) Filed: May 17, 1999

Related U.S. Application Data

(63) Continuation-in-part of application No. 08/762,620, filed on Dec. 6, 1996, now Pat. No. 6,013,173.

(51) Int. Cl.$^7$ .............................................. C10G 35/09
(52) U.S. Cl. ........................ 208/138; 208/137; 208/134
(58) Field of Search ................................ 208/134, 137, 208/138

(56) References Cited

U.S. PATENT DOCUMENTS

| | | | | |
|---|---|---|---|---|
| 3,915,845 A | | 10/1975 | Antos ........................ 208/139 |
| 4,003,826 A | * | 1/1977 | Antos ........................ 208/139 |
| 4,039,477 A | | 8/1977 | Engelhard et al. .......... 252/441 |
| 4,148,715 A | * | 4/1979 | Antos ........................ 208/139 |
| 4,485,185 A | * | 11/1984 | Onodera et al. .............. 502/71 |
| 4,588,497 A | * | 5/1986 | Blanchard et al. .......... 208/138 |
| 5,102,850 A | * | 4/1992 | Sanchez et al. ............. 502/261 |
| 5,314,854 A | * | 5/1994 | Galperin ..................... 502/66 |
| 5,665,223 A | | 9/1997 | Bogdan ..................... 208/138 |
| 5,958,216 A | * | 9/1999 | Glover ........................ 208/64 |
| 6,013,173 A | * | 1/2000 | Bogdan ..................... 208/139 |
| 6,059,960 A | * | 5/2000 | Bogdan ..................... 208/139 |

* cited by examiner

*Primary Examiner*—Nadine Preisch
(74) *Attorney, Agent, or Firm*—John G. Tolomei; John F. Spears, Jr.; Thomas K. McBride, Jr.

(57) ABSTRACT

A novel catalyst and the use thereof in a reforming process is disclosed. The catalyst comprises a refractory inorganic oxide, platinum-group metal, uniform Group IVA(IUPAC 14) metal and surface-layer lanthanide-series metal. The catalyst is particularly suitable for the reforming of a hydrocarbon feedstock to obtain an aromatics-rich product.

7 Claims, 8 Drawing Sheets

CATALYTIC REFORMING PROCESS EMPLOYING A SELECTIVE BIFUNCTIONAL MULTIGRADIENT MULTIMETALLIC CATALYST

CROSS REFERENCE TO RELATED APPLICATIONS

This application is a continuation-in-part of application Ser. No. 08/762,620 filed Dec. 6, 1996, and now U.S. Pat. No. 6,013,173.

FIELD OF THE INVENTION

This invention relates to an improved catalyst for the conversion of hydrocarbons, and more specifically for the catalytic reforming of gasoline-range hydrocarbons.

BACKGROUND OF THE INVENTION

The subject of the present invention is a novel dual-function catalyst, characterized by a multimetallic, multi-gradient combination of three or more metal components in specified concentrations on the finished catalyst, and its use in hydrocarbon conversion. Catalysts having both a hydrogenation-dehydrogenation function and a cracking function are used widely in many applications, particularly in the petroleum and petrochemical industry, to accelerate a wide spectrum of hydrocarbon-conversion reactions. The cracking function generally relates to an acid-action material of the porous, adsorptive, refractory-oxide type which is typically utilized as the support or carrier for a heavy-metal component, such as the Group VIII(IUPAC 8–10) metals, which primarily contribute the hydrogenation-dehydrogenation function. Other metals in combined or elemental form can influence one or both of the cracking and hydrogenation-dehydrogenation functions.

In another aspect, the present invention comprehends improved processes that emanate from the use of the novel catalyst. These dual-function catalysts are used to accelerate a wide variety of hydrocarbon-conversion reactions such as dehydrogenation, hydrogenation, hydrocracking, hydrogenolysis, isomerization, desulfurization, cyclization, alkylation, polymerization, cracking, and hydroisomerization. In a specific aspect, an improved reforming process utilizes the subject catalyst to increase selectivity to gasoline and aromatics products.

Catalytic reforming involves a number of competing processes or reaction sequences. These include dehydrogenation of cyclohexanes to aromatics, dehydroisomerization of alkylcyclopentanes to aromatics, dehydrocyclization of an acyclic hydrocarbon to aromatics, hydrocracking of paraffins to light products boiling outside the gasoline range, dealkylation of alkylbenzenes and isomerization of paraffins. Some of the reactions occurring during reforming, such as hydrocracking which produces light paraffin gases, have a deleterious effect on the yield of products boiling in the gasoline range. Process improvements in catalytic reforming thus are targeted toward enhancing those reactions effecting a higher yield of the gasoline fraction at a given octane number.

It is of critical importance that a dual-function catalyst exhibit the capability both to initially perform its specified functions efficiently and to perform them satisfactorily for prolonged periods of time. The parameters used in the art to measure how well a particular catalyst performs its intended functions in a particular hydrocarbon reaction environment are activity, selectivity and stability. In a reforming environment, these parameters are defined as follows:

(1) Activity is a measure of the ability of the catalyst to convert hydrocarbon reactants to products at a designated severity level, with severity level representing a combination of reaction conditions: temperature, pressure, contact time, and hydrogen partial pressure. Activity typically is designated as the octane number of the pentanes and heavier ("$C_5+$") product stream from a given feedstock at a given severity level, or conversely as the temperature required to achieve a given octane number.

(2) Selectivity refers to the percentage yield of petrochemical aromatics or $C_5+$ gasoline product from a given feedstock at a particular activity level.

(3) Stability refers to the rate of change of activity or selectivity per unit of time or of feedstock processed. Activity stability generally is measured as the rate of change of operating temperature per unit of time or of feedstock to achieve a given $C_5+$ product octane, with a lower rate of temperature change corresponding to better activity stability, since catalytic reforming units typically operate at relatively constant product octane. Selectivity stability is measured as the rate of decrease of $C_5+$ product or aromatics yield per unit of time or of feedstock.

Programs to improve performance of reforming catalysts are being stimulated by the reformulation of gasoline, following upon widespread removal of lead antiknock additive, in order to reduce harmful vehicle emissions. Gasoline-upgrading processes such as catalytic reforming must operate at higher efficiency with greater flexibility in order to meet these changing requirements. Catalyst selectivity is becoming ever more important to tailor gasoline components to these needs while avoiding losses to lower-value products. The major problem facing workers in this area of the art, therefore, is to develop more selective catalysts while maintaining effective catalyst activity and stability.

The art teaches a variety of multimetallic catalysts for the catalytic reforming of naphtha feedstocks. Most of these comprise combinations of platinum-group metals with rhenium and/or Group IVA(IUPAC 14) metals.

U.S. Pat. No. 3,915,845 (Antos) discloses hydrocarbon conversion with a catalyst comprising a platinum-group metal, Group IVA metal, halogen and lanthanide in an atomic ratio to platinum-group metal of 0.1 to 1.25. The preferred lanthanides are lanthanum, cerium, and especially neodymium which was exemplified in Antos. U.S. Pat. No. 4,039,477 (Engelhard et al.) discloses a catalyst for the catalytic hydrotreatment of hydrocarbons comprising a refractory metal oxide, platinum-group metal, tin and at least one metal from yttrium, thorium, uranium, praseodymium, cerium, lanthanum, neodymium, samarium, dysprosium and gadolinium with favorable results being observed at relatively low ratios of the latter metals to platinum. U.S. Pat. No. 5,665,223 (Bogdan) teaches a catalytic composite comprising a refractory inorganic oxide, Group IVA(IUPAC 14) metal, platinum-group metal and europium wherein the atomic ratio of europium to platinum-group metal is at least about 1.3.

SUMMARY OF THE INVENTION

It is an object of the invention to provide a novel catalyst for hydrocarbon conversion. A corollary object of the invention is to provide a reforming process having improved activity and selectivity for the production of gasoline and/or aromatics.

The invention originates from the discovery that a catalyst containing platinum, tin and cerium on chlorided alumina shows a favorable ratio of aromatization to cracking in a reforming reaction.

A broad embodiment of the present invention is a catalyst comprising a refractory inorganic oxide and a multimetallic, multigradient metal component comprising a platinum-group metal component, a Group IVA(IUPAC 14) metal component, and a surface-layer lanthanide-series metal component. The platinum-group-metal generally is present in the catalyst in an amount of about 0.01 to 2 mass-% on an elemental basis of component, the Group IVA(IUPAC 14) metal component in an amount of about 0.01 to 5 mass-% on an elemental basis, and the surface-layer lanthanide-series-metal component in an amount of about 0.05 to 5 mass-% on an elemental basis. The atomic ratio of the lanthanide metal to platinum-group metal preferably is at least about 1.5, more preferably at least about 2. The catalyst optimally also comprises a halogen, especially chlorine. In preferred embodiments the refractory inorganic oxide is alumina, the platinum-group metal is platinum, the Group IVA(IUPAC 14) metal is tin, and the lanthanide-series metal is cerium. A highly preferred catalyst consists essentially of platinum, tin and cerium on a halogenated alumina support.

In another aspect, the invention is a process for the conversion of a hydrocarbon feedstock to obtain an aromatics-enhanced product utilizing a catalyst comprising a refractory inorganic oxide and a multimetallic, multigradient metal component comprising a platinum-group metal component, a Group IVA(IUPAC 14) metal component, and a surface-layer lanthanide-series metal component. Preferably the hydrocarbon conversion is catalytic reforming of a naphtha feedstock, utilizing the catalyst of the invention to increase the yield of gasoline and/or aromatics in the product.

These as well as other objects and embodiments will become evident from the following more detailed description of the present invention.

DESCRIPTION OF THE PREFERRED EMBODIMENTS

A broad embodiment of the present invention, therefore, is a catalyst comprising a refractory inorganic-oxide support, a platinum-group metal, at least one metal of Group IVA(IUPAC 14) of the Periodic Table [See Cotton and Wilkinson, *Advanced Inorganic Chemistry*, John Wiley & Sons (Fifth Edition, 1988)] and a lanthanide-series metal, preferably in combination with a halogen.

The refractory support utilized in the present invention usually is a porous, adsorptive, high-surface area support having a surface area of about 25 to about 500 $m^2/g$. The porous carrier material should also be uniform in composition and relatively refractory to the conditions utilized in the hydrocarbon conversion process. By the terms "uniform in composition" it is meant that the support be unlayered, has no concentration gradients of the species inherent to its composition, and is completely homogeneous in composition. Thus, if the support is a mixture of two or more refractory materials, the relative amounts of these materials will be constant and uniform throughout the entire support. Included within the scope of the present invention carrier are materials which have traditionally been utilized in dual-function hydrocarbon conversion catalysts such as:

(1) refractory inorganic oxides such as alumina, magnesia, titania, zirconia, chromia, zinc oxide, thoria, boria, silica-alumina, silica-magnesia, chromia-alumina, alumina-boria, silica-zirconia, etc.;

(2) ceramics, porcelain, bauxite;

(3) silica or silica gel, silicon carbide, clays and silicates which are synthetically prepared or naturally occurring, which may or may not be acid treated, for example attapulgus clay, diatomaceous earth, fuller's earth, kaolin, or kieselguhr;

(4) crystalline zeolitic aluminosilicates, such as X-zeolite, Y-zeolite, mordenite, β-zeolite, Ω-zeolite or L-zeolite, either in hydrogen form or preferably in nonacidic form with one or more alkali metals occupying the cationic exchangeable sites;

(5) non-zeolitic molecular sieves, such as aluminophosphates or silico-alumino-phosphates; and (6) combinations of two or more materials from one or more of these groups.

Preferably the refractory support comprises one or more inorganic oxides, with the preferred refractory inorganic oxide for use in the present invention being alumina. Suitable alumina materials are the crystalline aluminas known as the gamma-, eta-, and theta-alumina, with gamma- or eta-alumina giving best results. The preferred refractory inorganic oxide will have an apparent bulk density of about 0.3 to about 1.0 g/cc and surface area characteristics such that the average pore diameter is about 20 to 300 angstroms, the pore volume is about 0.1 to about 1 cc/g, and the surface area is about 100 to about 500 $m^2/g$.

Considering that alumina is the preferred refractory inorganic oxide, a particularly preferred alumina is that which has been characterized in U.S. Pat. Nos. 3,852,190 and 4,012,313 as a by-product from a Ziegler higher alcohol synthesis reaction as described in Ziegler's U.S. Pat. No. 2,892,858, hereinafter referred to as a "Ziegler alumina". Ziegler alumina is presently available from the Vista Chemical Company under the trademark "Catapal" or from Condea Chemie GmbH under the trademark "Pural," and will be available from ALCOA under the trademark "HiQ-20." This high-purity pseudoboehmite, after calcination at a high temperature, has been shown to yield a gamma-alumina of extremely high purity.

The alumina powder can be formed into particles of any desired shape or type of carrier material known to those skilled in the art such as spheres, rods, pills, pellets, tablets, granules, extrudates, and like forms by methods well known to the practitioners of the catalyst material forming art. Such particles preferably have at least one regular dimension, usually a circular cross-section and referred to herein as a "diameter," of between about 0.7 and about 3.5 mm.

The preferred form of the present catalyst support is a spherical particle, with a preferred diameter of between about 0.7 and about 3.5 mm. Alumina spheres may be continuously manufactured by the well known oil-drop method which comprises: forming an alumina hydrosol by any of the techniques taught in the art and preferably by reacting aluminum metal with hydrochloric acid; combining the resulting hydrosol with a suitable gelling agent; and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging and drying treatments in oil and an ammoniacal solution to further improve their physical characteristics. The resulting aged and gelled particles are then washed and dried at a relatively low temperature of about 150° to about 205° C. and subjected to a calcination procedure at a temperature of about 450° to about 700° C. for a period of about 1 to about 20 hours. This treatment effects conversion of the alumina hydrogel to the corresponding crystalline gamma-alumina. U.S. Pat. No. 2,620,314 provides additional details and is incorporated herein by reference thereto.

An alternative form of carrier material is a cylindrical extrudate, preferably prepared by mixing the alumina powder with water and suitable peptizing agents such as HCl until an extrudable dough is formed. The amount of water added to form the dough is typically sufficient to give a loss on ignition (LOI) at 500° C. of about 45 to 65 mass-%, with a value of 55 mass-% being preferred. The acid addition rate is generally sufficient to provide 2 to 7 mass-% of the volatile-free alumina powder used in the mix, with a value of 3 to 4 mass-% being preferred. The resulting dough is extruded through a suitably sized die to form extrudate particles. These particles are then dried at a temperature of about 260° to about 427° C. for a period of about 0.1 to 5 hours to form the extrudate particles. The preferred diameter of cylindrical extrudate particles is between about 0.7 and about 3.5 mm, with a length-to-diameter ratio of between about 1:1 and 5:1.

A platinum-group-metal component is an essential ingredient of the catalyst. This component comprises platinum, palladium, ruthenium, rhodium, iridium, osmium or mixtures thereof, with platinum being preferred. The platinum-group metal may exist within the final catalyst as a compound such as an oxide, sulfide, halide, oxyhalide, etc., in chemical combination with one or more of the other ingredients of the composite or as an elemental metal. Best results are obtained when substantially all of this component is present in the elemental state and it is homogeneously dispersed within the carrier material. This component may be present in the final catalyst composite in any amount which is catalytically effective; the platinum-group metal generally will comprise about 0.01 to about 2 mass-% of the final catalyst, calculated on an elemental basis. Excellent results are obtained when the catalyst contains about 0.05 to about 1 mass-% of platinum.

The platinum-group-metal component may be incorporated in the porous carrier material in any suitable manner, such as coprecipitation, ion-exchange or impregnation. The preferred method of preparing the catalyst involves the utilization of a soluble, decomposable compound of platinum-group metal to impregnate the carrier material in a relatively uniform manner. For example, the component may be added to the support by commingling the latter with an aqueous solution of chloroplatinic or chloroiridic or chloropalladic acid. Other water-soluble compounds or complexes of platinum-group metals may be employed in impregnating solutions and include ammonium chloroplatinate, bromoplatinic acid, platinum trichloride, platinum tetrachloride hydrate, platinum dichlorocarbonyl dichloride, dinitrodiaminoplatinum, sodium tetranitroplatinate (II), palladium chloride, palladium nitrate, palladium sulfate, diamminepalladium (II) hydroxide, tetramminepalladium (II) chloride, hexamminerhodium chloride, rhodium carbonylchloride, rhodium trichloride hydrate, rhodium nitrate, sodium hexachlororhodate (III), sodium hexanitrorhodate (III), iridium tribromide, iridium dichloride, iridium tetrachloride, sodium hexanitroiridate (III), potassium or sodium chloroiridate, potassium rhodium oxalate, etc. The utilization of a platinum, iridium, rhodium, or palladium chloride compound, such as chloroplatinic, chloroiridic or chloropalladic acid or rhodium trichloride hydrate, is preferred since it facilitates the incorporation of both the platinum-group-metal component and at least a minor quantity of the preferred halogen component in a single step. Hydrogen chloride or the like acid is also generally added to the impregnation solution in order to further facilitate the incorporation of the halogen component and the uniform distribution of the metallic components throughout the carrier material. In addition, it is generally preferred to impregnate the carrier material after it has been calcined in order to minimize the risk of washing away the valuable platinum-group metal.

Generally the platinum-group-metal component is dispersed homogeneously in the catalyst. Dispersion of the platinum-group metal preferably is determined by Scanning Transmission Electron Microscope (STEM), comparing metals concentrations with overall catalyst metal content. In an alternative embodiment one or more platinum-group-metal components may be present as a surface-layer component as described in U.S. Pat. No. 4,677,094, incorporated by reference. The "surface layer" is the layer of a catalyst particle adjacent to the surface of the particle, and the concentration of surface-layer metal tapers off in progressing from the surface to the center of the catalyst particle.

A Group IVA(IUPAC 14) metal component is another essential ingredient of the catalyst of the present invention. Of the Group IVA(IUPAC 14) metals, germanium and tin are preferred and tin is especially preferred. This component may be present as an elemental metal, as a chemical compound such as the oxide, sulfide, halide, oxychloride, etc., or as a physical or chemical combination with the porous carrier material and/or other components of the catalyst. Preferably, a substantial portion of the Group IVA(IUPAC 14) metal exists in the finished catalyst in an oxidation state above that of the elemental metal. The Group IVA(IUPAC 14) metal component optimally is utilized in an amount sufficient to result in a final catalyst containing about 0.01 to about 5 mass % metal, calculated on an elemental basis, with best results obtained at a level of about 0.1 to about 2 mass-% metal.

The Group IVA(IUPAC 14) metal component may be incorporated in the catalyst in any suitable manner to achieve a homogeneous dispersion, such as by coprecipitation with the porous carrier material, ion-exchange with the carrier material or impregnation of the carrier material at any stage in the preparation. One method of incorporating the Group IVA(IUPAC 14) metal component into the catalyst composite involves the utilization of a soluble, decomposable compound of a Group IVA(IUPAC 14) metal to impregnate and disperse the metal throughout the porous carrier material. The Group IVA(IUPAC 14) metal component can be impregnated either prior to, simultaneously with, or after the other components are added to the carrier material. Thus, the Group IVA(IUPAC 14) metal component may be added to the carrier material by commingling the latter with an aqueous solution of a suitable metal salt or soluble compound such as stannous bromide, stannous chloride, stannic chloride, stannic chloride pentahydrate; or germanium oxide, germanium tetraethoxide, germanium tetrachloride; or lead nitrate, lead acetate, lead chlorate and the like compounds. The utilization of Group IVA(IUPAC 14) metal chloride compounds, such as stannic chloride, germanium tetrachloride or lead chlorate is particularly preferred since it facilitates the incorporation of both the metal component and at least a minor amount of the preferred halogen component in a single step. When combined with hydrogen chloride during the especially preferred alumina peptization step described hereinabove, a homogeneous dispersion of the Group IVA(IUPAC 14) metal component is obtained in accordance with the present invention. In an alternative embodiment, organic metal compounds such as trimethyltin chloride and dimethyltin dichloride are incorporated into the catalyst during the peptization of the inorganic oxide binder, and most preferably during peptization of alumina with hydrogen chloride or nitric acid.

A lanthanide-series metal component is another essential component of the present catalyst. Included in the lanthanide series are lanthanum, cerium, praseodymium, neodymium, promethium, samarium, europium, gadolinium, terbium, dysprosium, holmium, erbium, thulium, ytterbium and lutetium; a cerium component is preferred. The lanthanide component may in general be present in the catalyst in any catalytically available form such as the elemental metal, a compound such as the oxide, hydroxide, halide, oxyhalide, aluminate, or in chemical combination with one or more of the other ingredients of the catalyst. Although not intended to so restrict the present invention, it is believed that best results are obtained when the lanthanide component is present in the composite in a form wherein substantially all of the lanthanide moiety is in an oxidation state above that of the elemental metal such as in the form of the oxide, oxyhalide or halide or in a mixture thereof and the subsequently described oxidation and reduction steps that are preferably used in the preparation of the instant catalyst are specifically designed to achieve this end.

The lanthanide-series metal component is concentrated in the surface layer of each catalyst particle. In defining the present invention, "layer" is a stratum of a catalyst particle of substantially uniform thickness at a substantially uniform distance from the surface of the catalyst particle. The "surface layer" is the layer of the catalyst particle adjacent to the surface of the particle. The surface-layer concentration is the average of measurements within a surface layer which, for purposes of characterizing the present invention, is about 100 microns deep. The concentration of surface-layer lanthanide-group metal tapers off in progressing from the surface to the center of the catalyst particle, and is substantially lower in the "central core" of the particle than in its surface layer. "Central core" is defined, in characterizing the present invention, as a core of a catalyst particle representing 50% of the diameter of the particle. "Diameter" is defined as the minimum regular dimension through the center of the catalyst particle; for example, this dimension would be the diameter of the cylinder of an extrudate. For the preferred spherical particles of the present invention, the central core is a spherical portion in the center of the particle having a diameter 50% of that of the spherical particle. These definitions, do not exclude the use of other quantitative criteria for defining the gradient of metal concentration in a catalyst particle. In the present invention, however, the surface-layer component is measured as the concentration in the layer which extends 100 microns from the surface of the particle and the central core represents 50% of the diameter of the particle.

The gradient of the metal promoter preferably is determined by Scanning Electron Microscopy ("SEM"). SEM determinations of local metal concentrations are effected on at least three sample particles from a bed of catalyst particles. Samples are selected from the bed by techniques known to those of ordinary skill in the art. The SEM data show the approximate metals content of any one point within a catalyst particle, based on the metals distribution profile in relation to the quantity of support. Measurement of the surface-layer concentration is effected as the average of the concentration in the 100-micron surface layer of at least three catalyst particles The result of each analysis may not be based upon a zero point; attempting to integrate a distribution curve is not possible, and could lead to interpretation errors as the entire curve could be shifted either up or down. However, the data are useful for making relative comparisons of metal distributions The surface-layer lanthanide-series metal component, in characterizing the present invention, preferably has a concentration on an elemental basis as measured by SEM in the surface layer of particles of the catalyst which is at least about twice the concentration of the lanthanide-series metal in the central core of the particles. More preferably the metal concentration in the surface layer is at least about three times, and optimally about five times or more, the concentration in the central core of the particles. In an alternative definition, about 50% or more of a surface-layer metal is contained in the surface layer of a catalyst.

In contrast, a homogeneously dispersed metal component, while generally showing some variation in concentration through a catalyst particle, demonstrates a substantially smaller ratio of metal in the surface layer to metal in the central core than that characterizing the surface-layer metal. Measured by SEM, a homogeneously dispersed metal preferably has a concentration at one stratum on three or more catalyst particles which differs by less than about 50% from the average SEM metal concentration on the particles.

The surface-layer lanthanide may be incorporated into the catalyst particle in any manner suitable to effect a decreasing gradient of the metal from the surface to the center of the particle. One example of this would be by spray impregnation. A spray nozzle is located within a rotating drum which holds a catalyst support, and a solution of the salt of the surface-layer metal is ejected from the nozzle using air to form fine droplets of spray which contact the support in the rotating drum for effective mixing. Suitable salts may comprise but are not limited to the nitrates, sulfates, acetates, chlorides, bromides, iodides, ammine complexes, and organometallics such as the alkyl and alkoxide compounds. The volume ratio of solution to support is sufficient to effect the desired concentration of surface-layer metal in the catalyst, and preferably would be from about 0.3 to 1.0.

Alternatively, a metal component is impregnated as a compound, especially a salt, which decomposes at a pH of about 5 or more. For example, the preferred metal is impregnated as a chloride salt which decomposes upon contact. Other means, which do not limit the invention, include using a compound of the metal which complexes other components or which does not penetrate into the interior of the particle. An example is a multi-dentated ligand, such as carboxylic acids or metal compounds containing amino groups, thiol groups, phosphorus groups or other polar groups which can bond strongly to an oxide support.

The lanthanide-metal component is incorporated into the catalyst in any amount which is catalytically effective, with good results obtained with about 0.05 to about 5 mass-% lanthanide on an elemental basis in the catalyst. Best results are ordinarily achieved with about 0.2 to about 2 mass-% lanthanide, calculated on an elemental basis. The preferred atomic ratio of lanthanide to platinum-group metal for this catalyst is at least about 1.3:1, preferably about 1.5:1 or more, and especially from about 2:1 to about 5:1.

Optionally the catalyst may also contain other components or mixtures thereof which act alone or in concert as catalyst modifiers to improve activity, selectivity or stability. Some known catalyst modifiers include rhenium, cobalt, nickel, iron, tungsten, molybdenum, chromium, bismuth, antimony, zinc, cadmium and copper. Catalytically effective amounts of these components may be added in any suitable manner to the carrier material during or after its preparation or to the catalyst before, while or after other components are being incorporated.

Preferably, however, a metal component of the catalyst consists essentially of a platinum-group metal, a Group IVA(IUPAC 14) metal and a lanthanide-series metal, and more preferably of platinum, tin and cerium. The ratio of lanthanide-series metal to platinum-group metal is at least about 1.5, preferably about 2 or more, and more preferably at least about 4 on an atomic basis.

An optional component of the catalyst, useful in hydrocarbon conversion embodiments of the present invention comprising dehydrogenation, dehydrocyclization, or hydrogenation reactions, is an alkali or alkaline-earth metal component. More precisely, this optional ingredient is selected from the group consisting of the compounds of the alkali metals—cesium, rubidium, potassium, sodium, and lithium—and the compounds of the alkaline earth metals—calcium, strontium, barium, and magnesium. Generally, good results are obtained in these embodiments when this component constitutes about 0.01 to about 5 mass-% of the composite, calculated on an elemental basis. This optional alkali or alkaline earth metal component can be incorporated into the composite in any of the known ways with impregnation with an aqueous solution of a suitable water-soluble, decomposable compound being preferred.

As heretofore indicated, it is necessary to employ at least one oxidation step in the preparation of the catalyst. The conditions employed to effect the oxidation step are selected to convert substantially all of the metallic components within a catalytic composite to their corresponding oxide form. The oxidation step typically takes place at a temperature of from about 370° to about 650 C. An oxygen atmosphere is employed typically comprising air. Generally, the oxidation step will be carried out for a period of from about 0.5 to about 10 hours or more, the exact period of time being that required to convert substantially all of the metallic components to their corresponding oxide form. This time will, of course, vary with the oxidation temperature employed and the oxygen content of the atmosphere employed.

In addition to the oxidation step, a halogen adjustment step may also be employed in preparing the catalyst. As heretofore indicated, the halogen adjustment step may serve a dual function. First, the halogen adjustment step may aid in homogeneous dispersion of the Group IVA(IUPAC 14) metal and other metal component. Additionally, the halogen adjustment step can serve as a means of incorporating the desired level of halogen into the final catalyst. The halogen adjustment step employs a halogen or halogen-containing compound in air or an oxygen atmosphere. Since the preferred halogen for incorporation into the catalyst comprises chlorine, the preferred halogen or halogen-containing compound utilized during the halogen adjustment step is chlorine, HCl or precursor of these compounds. In carrying out the halogen adjustment step, the catalyst is contacted with the halogen or halogen-containing compound in air or an oxygen atmosphere at an elevated temperature of from about 370° to about 650° C. It is further desired to have water present during the contacting step in order to aid in the adjustment. In particular, when the halogen component of the catalyst comprises chlorine, it is preferred to use a mole ratio of water to HCl of about 5:1 to about 100:1. The duration of the halogenation step is typically from about 0.5 to about 5 hours or more. Because of the similarity of conditions, the halogen adjustment step may take place during the oxidation step. Alternatively, the halogen adjustment step may be performed before or after the oxidation step as required by the particular method being employed to prepare the catalyst of the invention. Irrespective of the exact halogen adjustment step employed, the halogen content of the final catalyst should be such that there is sufficient halogen to comprise, on an elemental basis, from about 0.1 to about 10 mass-% of the finished composite.

In preparing the catalyst, it is also necessary to employ a reduction step. The reduction step is designed to reduce substantially all of the platinum-group metal component to the corresponding elemental metallic state and to ensure a relatively uniform and finely divided dispersion of this component throughout the refractory inorganic oxide. It is preferred that the reduction step take place in a substantially water-free environment. Preferably, the reducing gas is substantially pure, dry hydrogen (i.e., less than 20 volume ppm water). However, other reducing gases may be employed such as CO, nitrogen, etc. Typically, the reducing gas is contacted with the oxidized catalytic composite at conditions including a reduction temperature of from about 315° to about 650° C. for a period of time of from about 0.5 to 10 or more hours effective to reduce substantially all of the platinum-group-metal component to the elemental metallic state. The reduction step may be performed prior to loading the catalytic composite into the hydrocarbon conversion zone or it may be performed in situ as part of a hydrocarbon conversion process start-up procedure. However, if this latter technique is employed, proper precautions must be taken to predry the conversion unit to a substantially water-free state, and a substantially water-free reducing gas should be employed.

Optionally, the catalytic composite may be subjected to a presulfiding step. The optional sulfur component may be incorporated into the catalyst by any known technique.

The catalyst of the present invention has particular utility as a hydrocarbon conversion catalyst. The hydrocarbon which is to be converted is contacted with the catalyst at hydrocarbon-conversion conditions, which include a temperature of from 40° to 300° C., a pressure of from atmospheric to 200 atmospheres absolute and liquid hourly space velocities from about 0.1 to 100 $hr^{-1}$. The catalyst is particularly suitable for catalytic reforming of gasoline-range feedstocks, and also may be used for, inter alia, dehydrocyclization, isomerization of aliphatics and aromatics, dehydrogenation, hydro-cracking, disproportionation, dealkylation, alkylation, transalkylation, and oligomerization.

The preferred reforming process of the present invention is effected at conditions including a pressure selected within the range of about 100 kPa to 7 MPa (abs). Particularly good results are obtained at low pressure, namely a pressure of about 350 to 2500 kPa (abs). Reforming temperature is in the range from about 315° to 600° C., and preferably from about 425° to 565° C. As is well known to those skilled in the reforming art, the initial selection of the temperature within this broad range is made primarily as a function of the desired octane of the product reformate considering the characteristics of the charge stock and of the catalyst. Ordinarily, the temperature then is thereafter slowly increased during the run to compensate for the inevitable deactivation that occurs to provide a constant octane product. Sufficient hydrogen is supplied to provide an amount of about 1 to about 20 moles of hydrogen per mole of hydrocarbon feed entering the reforming zone, with excellent results being obtained when about 2 to about 10 moles of hydrogen are used per mole of hydrocarbon feed. Likewise, the liquid hourly space velocity (LHSV) used in reforming is selected from the range of about 0.1 to about 20 $hr^{-1}$, with a value in the range of about 1 to about 5 $hr^{-1}$ being preferred.

The hydrocarbon feedstock that is charged to this reforming system preferably is a naphtha feedstock comprising naphthenes and paraffins that boil within the gasoline range. The preferred feedstocks are naphthas consisting principally of naphthenes and paraffins, although, in many cases, aromatics also will be present. This preferred class includes straight-run gasolines, natural gasolines, synthetic gasolines, and the like. As an alternative embodiment, it is frequently advantageous to charge thermally or catalytically cracked gasolines, partially reformed naphthas, or dehydrogenated naphthas. Mixtures of straight-run and cracked gasoline-range naphthas can also be used to advantage. The gasoline-range naphtha charge stock may be a full-boiling gasoline having an initial ASTM D-86 boiling point of from about 40–80° C. and an end boiling point within the range of from about 160–220° C., or may be a selected fraction thereof which generally will be a higher-boiling fraction commonly referred to as a heavy naphtha—for example, a naphtha boiling in the range of 100–200° C. If the reforming is directed to production of one or more of benzene, toluene and xylenes, the boiling range may be principally or substantially within the range of 60°–150° C. In some cases, it is also advantageous to process pure hydrocarbons or mixtures of hydrocarbons that have been recovered from extraction units—for example, raffinates from aromatics extraction or straight-chain paraffins—which are to be converted to aromatics.

It is generally preferred to utilize the present invention in a substantially water-free environment. Essential to the achievement of this condition in the reforming zone is the control of the water level present in the feedstock and the hydrogen stream which is being charged to the zone. Best results are ordinarily obtained when the total amount of water entering the conversion zone from any source is held to a level less than 50 ppm and preferably less than 20 ppm, expressed as weight of equivalent water in the feedstock. In general, this can be accomplished by careful control of the water present in the feedstock and in the hydrogen stream. The feedstock can be dried by using any suitable drying means known to the art. For example, the water content of the feedstock may be adjusted by suitable stripping operations in a fractionation column or like device. Alternatively or in addition, water may be removed using a conventional solid adsorbent having a high selectivity for water; for instance, sodium or calcium crystalline aluminosilicates, silica gel, activated alumina, molecular sieves, anhydrous calcium sulfate, high surface area sodium, and the like. In some cases, a combination of adsorbent drying and distillation drying may be used advantageously to effect almost complete removal of water from the feedstock.

It is preferred to maintain the water content of the hydrogen stream entering the hydrocarbon conversion zone at a level of about 10 to about 20 volume ppm or less. In the cases where the water content of the hydrogen stream is above this range, this can be conveniently accomplished by contacting the hydrogen stream with a suitable desiccant such as those mentioned above at conventional drying conditions.

It is a preferred practice to use the present invention in a substantially sulfur-free environment. Any control means known in the art may be used to treat the naphtha feedstock which is to be charged to the reforming reaction zone. For example, the feedstock may be subjected to adsorption processes, catalytic processes, or combinations thereof. Adsorption processes may employ molecular sieves, high surface area silica-aluminas, carbon molecular sieves, crystalline aluminosilicates, activated carbons, high surface area metallic containing compositions, such as nickel or copper and the like. It is preferred that these feedstocks be treated by conventional catalytic pretreatment methods such as hydrorefining, hydrotreating, hydrodesulfurization, etc., to remove substantially all sulfurous, nitrogenous and water-yielding contaminants therefrom, and to saturate any olefins that may be contained therein. Catalytic processes may employ traditional sulfur reducing catalysts known to the art including refractory inorganic oxide supports containing metals selected from the group comprising Group VI-B(6), Group II-B(12), and Group VIII(IUPAC 8–10) of the Periodic Table.

In the preferred catalytic reforming embodiment, hydrocarbon feedstock and a hydrogen-rich gas are preheated and charged to a reforming zone containing typically two to five reactors in series. Suitable heating means are provided between reactors to compensate for the net endothermic heat of reaction in each of the reactors. Reactants may contact the catalyst in individual reactors in either upflow, downflow, or radial flow fashion, with the radial flow mode being preferred. The catalyst is contained. in a fixed-bed system or, preferably, in a moving-bed system with associated continuous catalyst regeneration. Alternative approaches to reactivation of deactivated catalyst are well known to those skilled in the art, and include semiregenerative operation in which the entire unit is shut down for catalyst regeneration and reactivation or swing-reactor operation in which an individual reactor is isolated from the system, regenerated and reactivated while the other reactors remain on-stream. The preferred continuous catalyst regeneration in conjunction with a moving-bed system is disclosed, inter alia, in U.S. Pat. Nos. 3,647,680; 3,652,231; 3,692,496; and 4,832,291, all of which are incorporated herein by reference.

Effluent from the reforming zone is passed through a cooling means to a separation zone, typically maintained at about 0° to 65° C., wherein a hydrogen-rich gas is separated from a liquid stream commonly called "unstabilized reformate". The resultant hydrogen stream can then be recycled through suitable compressing means back to the reforming zone. The liquid phase from the separation zone is typically withdrawn and processed in a fractionating system in order to adjust the butane concentration, thereby controlling front-end volatility of the resulting reformate.

EXAMPLES

The following examples are presented to elucidate the catalyst and process of the present invention and demonstrate performance relative to the art. These examples are offered as illustrative embodiments and should not be interpreted as limiting the claims.

Example I

The feedstock on which catalyst comparisons were based was an essentially sulfur-free naphtha having characteristics as follows:

| Sp. gr. | | 0.736 |
|---|---|---|
| ASTM D-86, ° C: | IBP | 83 |
| | 10% | 93 |
| | 50% | 112 |
| | 90% | 136 |
| | EP | 161 |
| Mass-% | Paraffins | 60.4 |
| | Naphthenes | 26.7 |
| | Aromatics | 12.9 |

Catalytic reforming tests were performed on the above naphtha feedstock using catalysts of the invention in comparison with catalysts of the known art.

Example II

A spherical catalyst comprising platinum, tin and cerium on alumina was prepared to demonstrate the features of the invention. Tin was incorporated into alumina sol according to the known art, and the tin-containing alumina sol was oil-dropped to form 1.6 mm spheres which were steamed to dryness at about 10% LOI and calcined at 650° C. The spherical support then was impregnated with aqueous cerium nitrate at a solution-to-base ratio of 0.45:1 and calcined at 350° C. for 2 hours, impregnated with chloroplatinic acid in 2% HCl, dried and oxychlorinated at 525° C. followed by reduction with pure hydrogen at 565° C.

The finished catalyst of the invention was designated as Catalyst A, contained about 1.3 mass-% chloride and had the following approximate metals contents as mass-% of the elemental metal:

| Platinum | 0.38 |
|---|---|
| Tin | 0.3 |
| Cerium | 0.25 |

Example III

A spherical catalyst of the known art comprising platinum, tin and cerium on alumina was prepared as a control relative to the invention. Tin was incorporated into a spherical alumina support according to the known art as described in Example II. The spherical support then was impregnated with aqueous 3.5 mass-% cerium nitrate at a solution-to-base ratio of 1:1 and oxychlorinated at 525° C. for 2 hours, impregnated with chloroplatinic acid in 2% HCl, dried and oxychlorinated at 525° C. followed by reduction with pure hydrogen at 565° C.

The finished control was designated Catalyst B, contained about 1.4 mass-% chloride, and had the following approximate metals contents as mass-% of the elemental metal:

| Platinum | 0.37 |
|---|---|
| Tin | 0.3 |
| Cerium | 0.97 |

Example IV

A second control catalyst of the known art was prepared comprising platinum and tin on alumina was prepared for comparison to the invention. Tin was incorporated into a spherical alumina support according to the known art as described in Example II. The spherical support then was impregnated with chloroplatinic acid in 2% HCl, dried and oxychlorinated at 525° C. followed by reduction with pure hydrogen at 565° C. The second control was designated Catalyst C and had the following approximate metals contents as mass-% of the elemental metal:

| Platinum | 0.37 |
|---|---|
| Tin | 0.3 |

Example V

Catalysts A and B were evaluated by Scanning Election Microscopy (SEM). The purpose of this analysis was to identify the relative distribution of cerium across the radius of the catalyst particles. Three particles each of Catalysts A and B were evaluated in order to provide reliable average data.

The SEM data shows the approximate metals content of any one point within the catalyst pill, as indicated hereinabove, based on the metals distribution profile in relation to the support. The data are useful for making relative comparisons of metal distributions.

Figure 1:
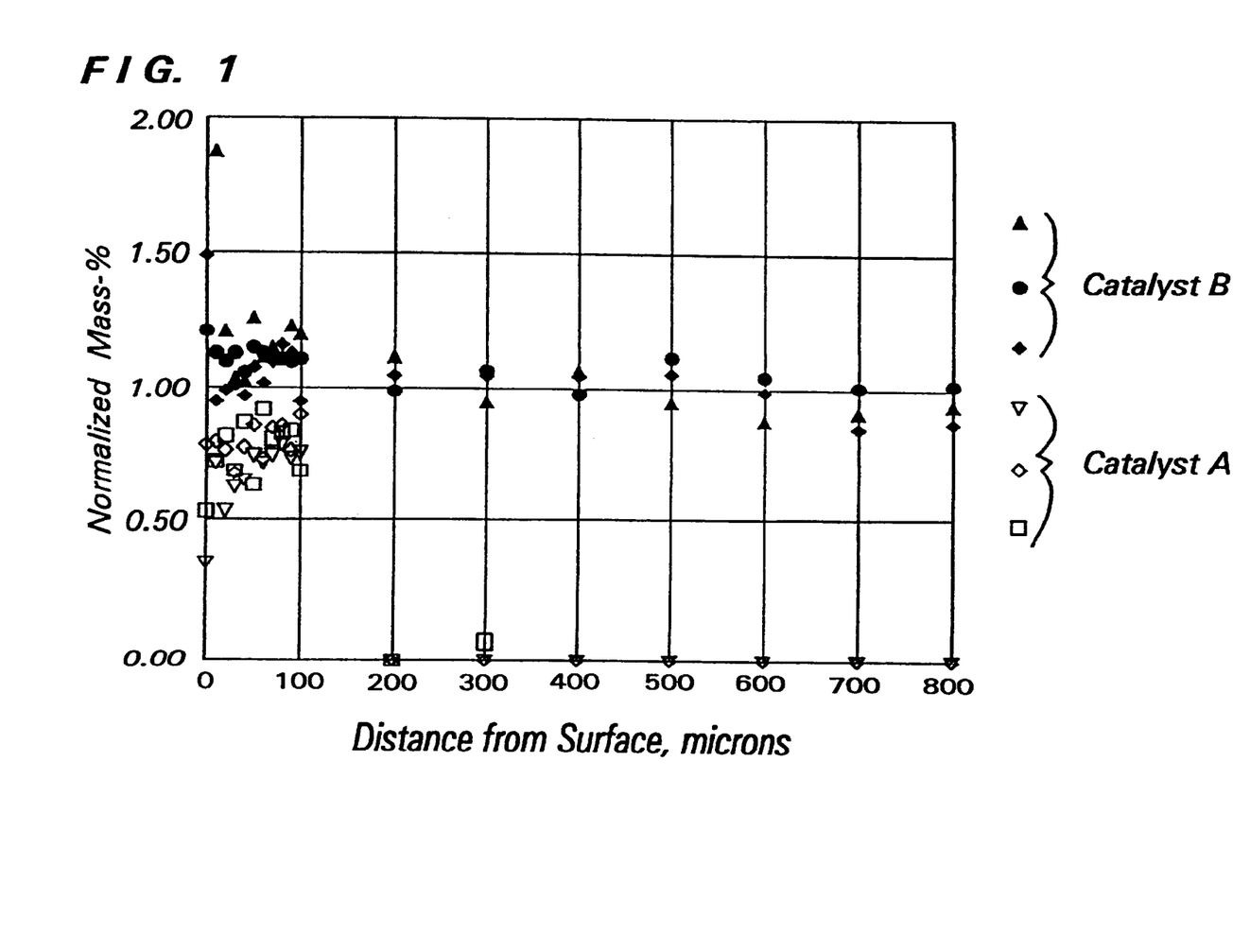
FIG. 1 illustrates cerium distribution in catalyst particles of the invention in comparison to distribution in particles of the known art.

FIG. 1 shows the relative distribution of the cerium concentration across the 800-micron radius of particles of Catalyst A from the surface to the center of each particle. Catalyst A displayed an exceptionally high concentration of cerium on a relative basis in the surface layer of the catalyst particles. Since there was virtually no cerium identified in any layer beyond the 100-micron surface layer, the concentration of cerium in the 100-micron surface layer was at least several times higher than in the central core representing 50% of the diameter of the catalyst.

In contrast, the cerium concentration in the 100-micron surface layer of Catalyst B differed by no more than about 10–20% from the concentration in the central core.

Example VI

Pilot-plant tests were structured to compare the activity and selectivity of Catalyst A of the invention with Catalysts B and C of the known art in the catalytic reforming of a feedstock as described in Example I.

Each test was based on reforming conditions comprising a pressure of 0.8 MPa (abs), a liquid hourly space velocity of 3 hr$^{-1}$, and a hydrogen/hydrocarbon ratio of 8. A range of conversion was studied by varying temperature to provide data points for each catalyst at 502° C., 512° C., 522° C., and 532° C.

Figure 2:
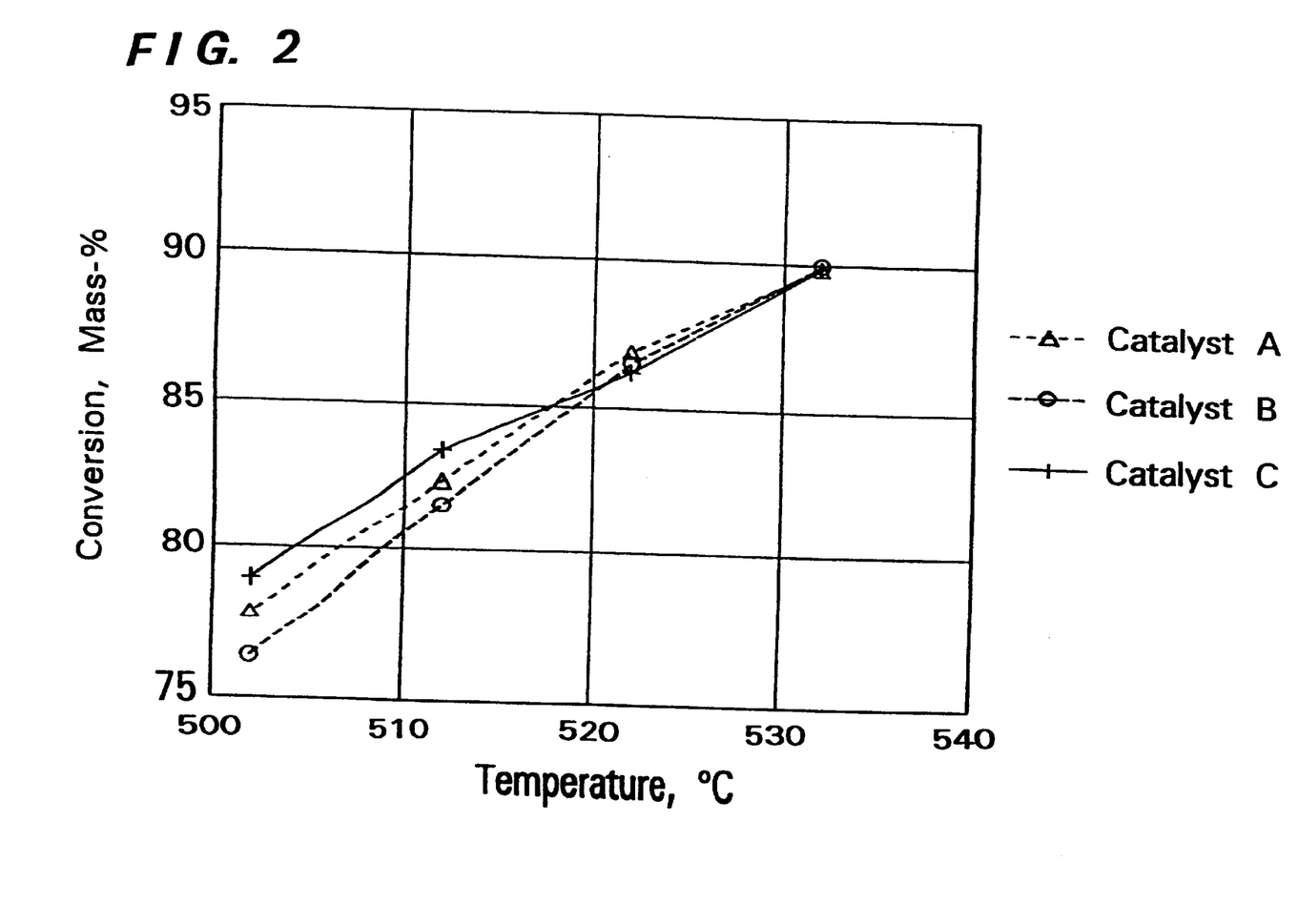
FIG. 2 shows conversion of paraffins+naphthenes as a function of catalyst temperature when reforming naphtha using catalysts of the invention and of the known art.

FIG. 2 compares the activity of Catalysts A, B and C over the above temperature range. Activity of the cerium-containing catalysts, determined as the temperature requirement for a given conversion, was less favorable at low conversions and somewhat more favorable at high conversions relative to Catalyst C of the known art. Catalyst A of the invention generally showed an activity advantage over Catalyst B of the known art.

Figure 3:
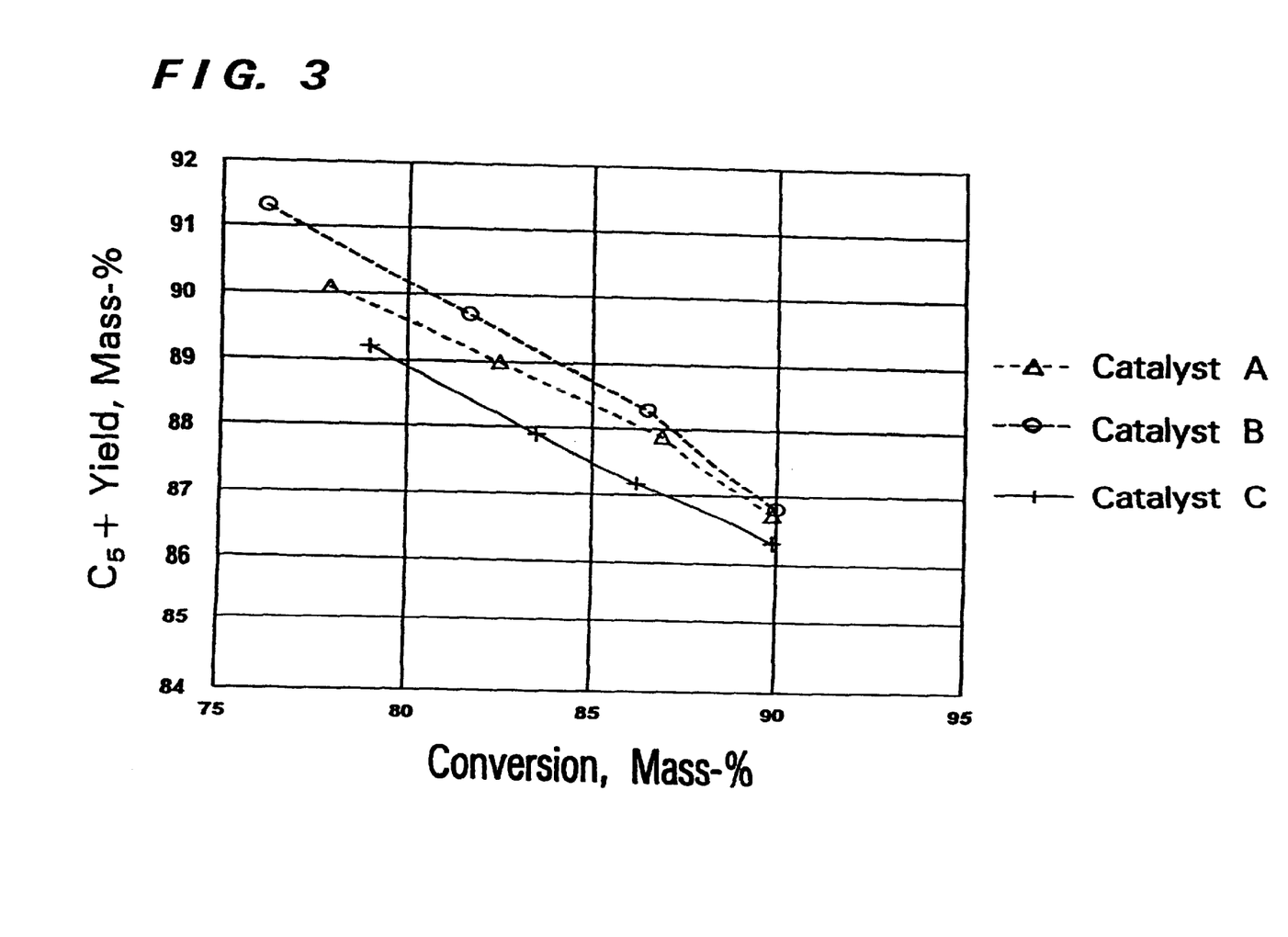
FIG. 3 shows $C_5+$ product yields as a function of conversion when reforming naphtha consistent with the results of FIG. 2 for catalysts of the invention and of the known art.

FIG. 3 compares the selectivity, measured as mass-% $C_5+$ yield, of Catalysts A, B and C. Both of the cerium-containing catalysts A and B showed a selectivity advantage over the control Catalyst C. Catalyst B demonstrated higher selectivity; however, Catalyst A of the invention obtained about 50–80% of this selectivity advantage with about ¼ of the content of cerium, which contributes significantly to catalyst cost, in comparison to Catalyst B(0.25 vs. 0.97 mass-%, respectively). Example II

Example VII

Another spherical catalyst comprising platinum, tin and cerium on alumina was prepared to demonstrate the features of the invention. Tin was incorporated into alumina sol according to the known art, and the tin-containing alumina sol was oil-dropped to form 1.6 mm spheres which were calcined at 650° C. The spherical support then was impregnated with chloroplatinic acid, steam calcined at 525° C., impregnated with cerium nitrate in deionized water, dried and oxychlorinated at 525° C. followed by reduction with pure hydrogen at 565° C.

The finished catalyst of the invention was designated as Catalyst D, contained about 1.3 mass-% chloride and had the following approximate metals contents as mass-% of the elemental metal:

| | |
|---|---|
| Platinum | 0.3 |
| Tin | 0.3 |
| Cerium | 0.94 |

Example VIII

A spherical catalyst of the known art comprising platinum, tin and cerium on alumina was prepared as a control relative to Catalyst D of the invention. Tin was incorporated into a spherical alumina support according to the known art. The spherical support then was impregnated with chloroplatinic acid, steam calcined at 525° C., impregnated with cerium nitrate in 2 mass-% HCl, dried and oxychlorinated at 525° C. followed by reduction with pure hydrogen at 565° C.

The finished control was designated Catalyst E, contained about 1.3 mass-% chloride, and had the following approximate metals contents as mass-% of the elemental metal:

| | |
|---|---|
| Platinum | 0.3 |
| Tin | 0.3 |
| Cerium | 0.95 |

Example IX

Catalysts D and E were evaluated by Scanning Electron Microscopy (SEM). The purpose of this analysis was to identify the relative distribution of cerium across the radius of the catalyst particles. Three particles each of Catalysts D and E were evaluated in order to provide reliable average data.

The SEM data shows the approximate metals content of any one point within the catalyst pill, as indicated hereinabove, based on the metals distribution profile in relation to the support. The data are useful for making relative comparisons of metal distributions.

Figure 4:
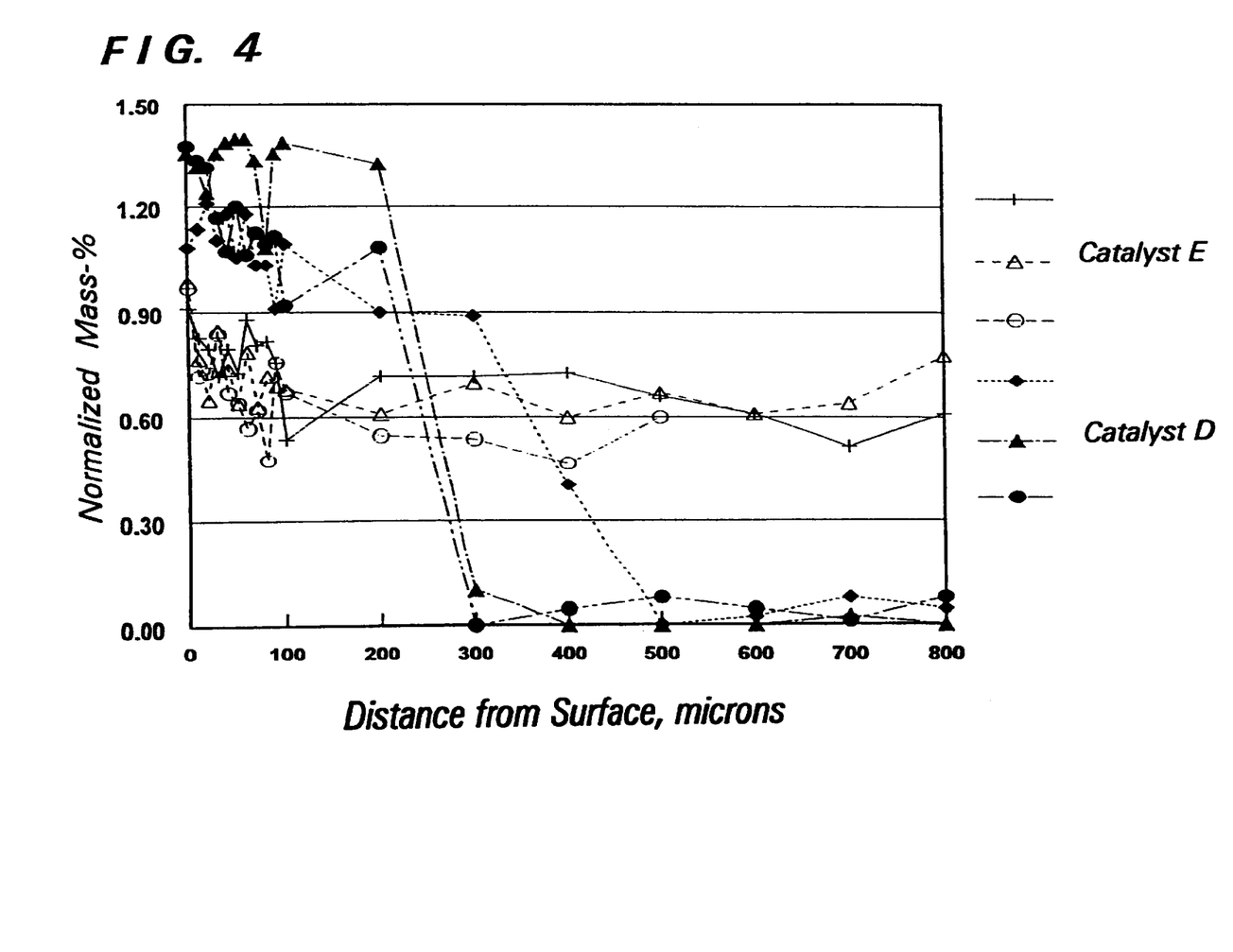
FIG. 4 illustrates cerium distribution in catalyst particles of the invention in comparison to distribution in particles of the known art.

FIG. 4 shows the relative distribution of the cerium concentration across the 800-micron radius of particles of Catalyst D from the surface to the center of each particle. Catalyst D displayed an exceptionally high concentration of cerium on a relative basis in the surface layer of the catalyst particles. The concentration of cerium in the 100-micron surface layer was at least an order of magnitude higher than in the central core representing 50% of the diameter of the catalyst.

In contrast, the cerium concentration in the 100-micron surface layer of Catalyst E differed by no more than about 20% from the concentration in the central core.

Example X

Pilot-plant tests were structured to compare the activity and selectivity of Catalyst D of the invention with Catalyst E of the known art in the catalytic reforming of a feedstock having the following characteristics:

| | | |
|---|---|---|
| Sp. gr. | | 0.753 |
| ASTM D-86, ° C.: | IBP | 89 |
| | 50% | 105 |
| | EP | 182 |
| Mass-% | Paraffins | 59 |
| | Naphthenes | 26 |
| | Aromatics | 15 |

Each test was based on reforming conditions comprising a pressure of 0.8 MPa (abs), a liquid hourly space velocity of 3 $hr^{-1}$, and a hydrogen/hydrocarbon ratio of 2. The operating temperature was established as that necessary to obtain a $C_5+$ product having a Research octane number of 102 clear.

The catalysts showed the following comparative performance:

| | Catalyst D | Catalyst E |
|---|---|---|
| Temperature required, ° C. | 518 | 516 |
| $C_5$ + yield, mass-% | 88.5 | 87.6 |

Catalyst D of the invention thus was 2° C. less active than the control, but showed a significant selectivity advantage of 0.9 mass-%.

Example XI

A composite comprising tin and surface cerium on alumina was prepared to demonstrate the features of the invention. Tin was incorporated into alumina sol according to the known art, and the tin-containing alumina sol was oil-dropped to form 1.6 mm spheres. The spherical support then was impregnated with aqueous cerium nitrate at a solution-to-base ratio of 0.45:1 and were oxychlorinated at 525° C. for 2 hours and dried at 525° C. The composite was designated as Composite X and contained about 1 mass-% chloride and 0.15 mass-% cerium expressed as content of the elemental metal:

Example XII

A composite comprising tin and surface lanthanum on alumina was prepared to demonstrate the features of the invention. Tin was incorporated into alumina sol according to the known art, and the tin-containing alumina sol was oil-dropped to form 1.6 mm spheres. The spherical support then was impregnated with aqueous lanthanum nitrate at a solution-to-base ratio of 0.45:1 and were oxychlorinated at 525° C. for 2 hours and dried at 525° C. The composite was designated as Composite Y and contained about 1 mass-% chloride and 0.15 mass-% lanthanum expressed as content of the elemental metal:

Example XIII

Composites X and Y were evaluated by Scanning Electron Microscopy (SEM). The purpose of this analysis was to identify the relative distribution of tin and cerium across the radius of the catalyst particles. Three particles each of Catalysts A and B were evaluated in order to provide reliable average data.

The SEM data shows the approximate metals content of any one point within the catalyst pill, as indicated hereinabove, based on the metals distribution profile in relation to the support. The data are useful for making relative comparisons of metal distributions.

Figure 5:
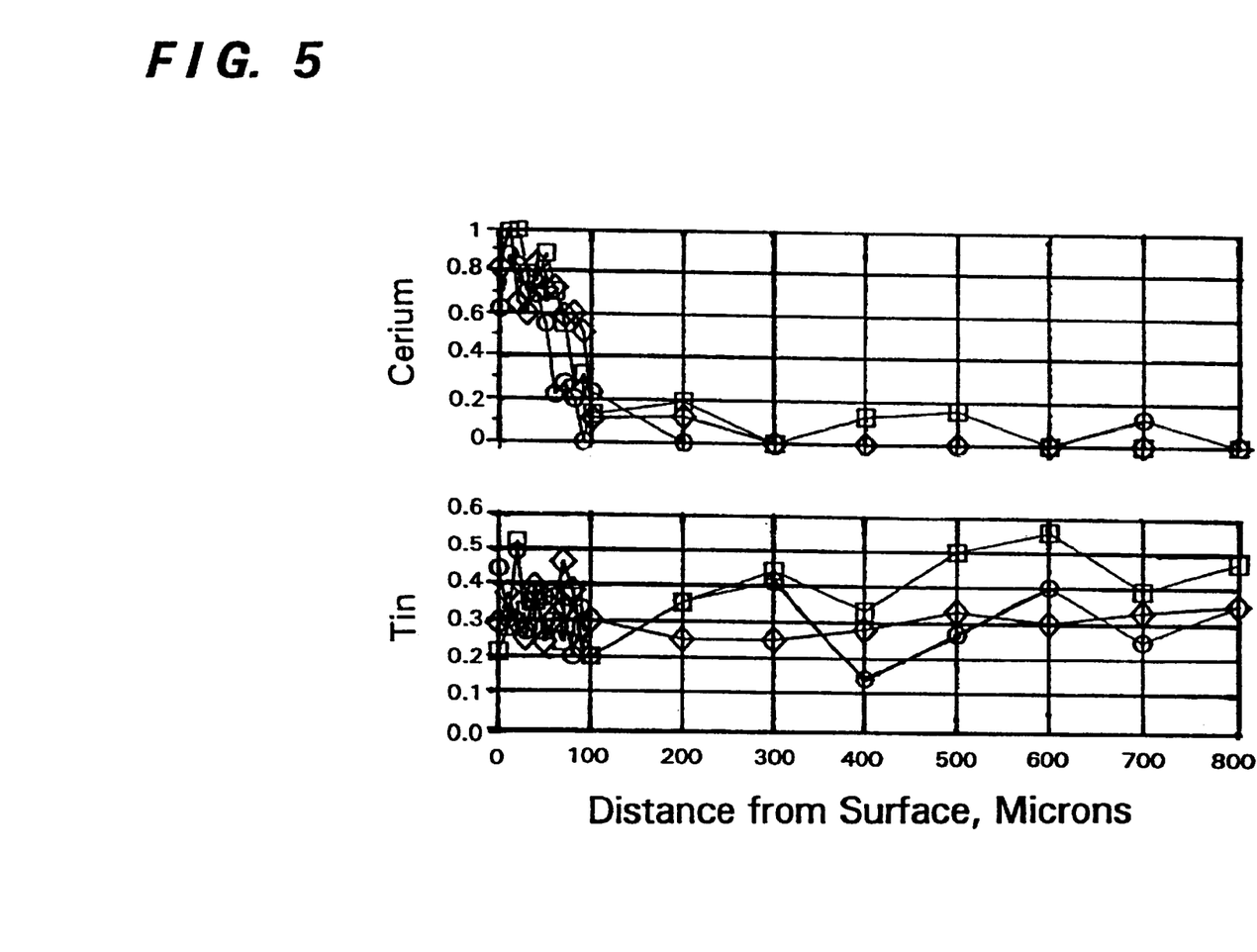
FIG. 5 illustrates cerium and tin distribution in a cerium-tin reforming composite of the invention.

FIG. 5 shows the relative distribution of the cerium and tin concentration across the 800-micron radius of particles of Composite X from the surface to the center of each particle. Composite X displayed an exceptionally high concentration of cerium on a relative basis in the surface layer of the catalyst particles. The concentration of cerium in the 100-micron surface layer was about an order of magnitude (10 times) or more higher than in the central core representing 50% of the diameter of the catalyst.

In contrast, the tin concentration showed no clear pattern away from uniform dispersion across the layers of the composite.

Figure 6:
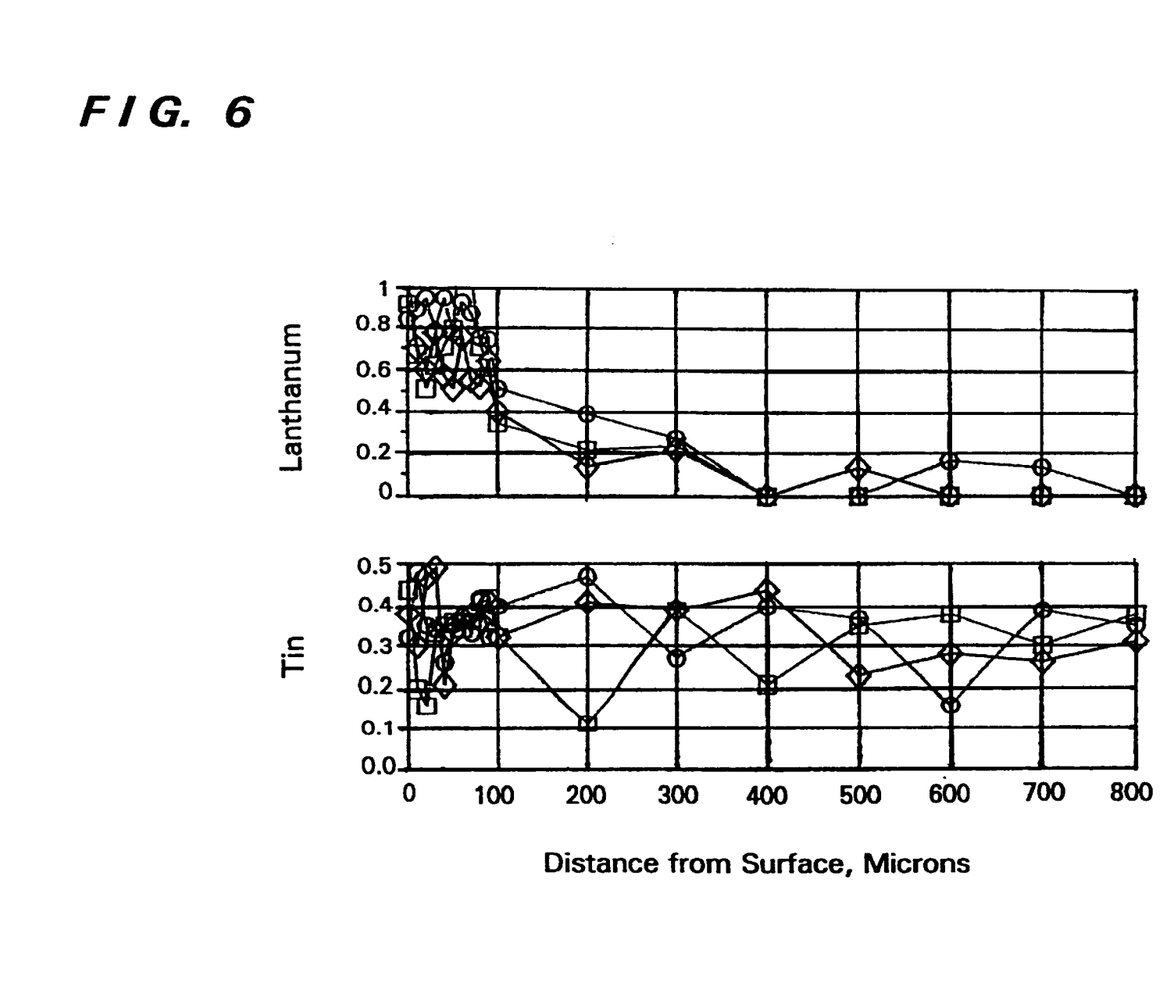
FIG. 6 illustrates lanthanum and tin distribution in a lanthanum-tin reforming composite of the invention.

FIG. 6 shows the relative distribution of the lanthanum and tin concentration across the 800-micron radius of particles of Composite Y from the surface to the center of each particle. Composite Y displayed an exceptionally high concentration of lanthanum on a relative basis in the surface layer of the catalyst particles. The concentration of lanthanum in the 100-micron surface layer was about 4–6 times higher than in the central core representing 50% of the diameter of the catalyst.

In contrast, the tin concentration showed no clear pattern away from uniform dispersion across the layers of the composite.

Example XIV

Composites X and Y were ground to 40–60 mesh particles along with a control comprising the base before platinum addition of Catalyst C, here designated Composite Z. The three composites were tested comparatively in the conversion of 1-heptene, a measure of alumina activity, at a temperature of 425° C. and atmospheric pressure (13 torr 1-heptene, balance $H_2$) over a range of gas hourly space velocities (GHSV).

Figure 7:
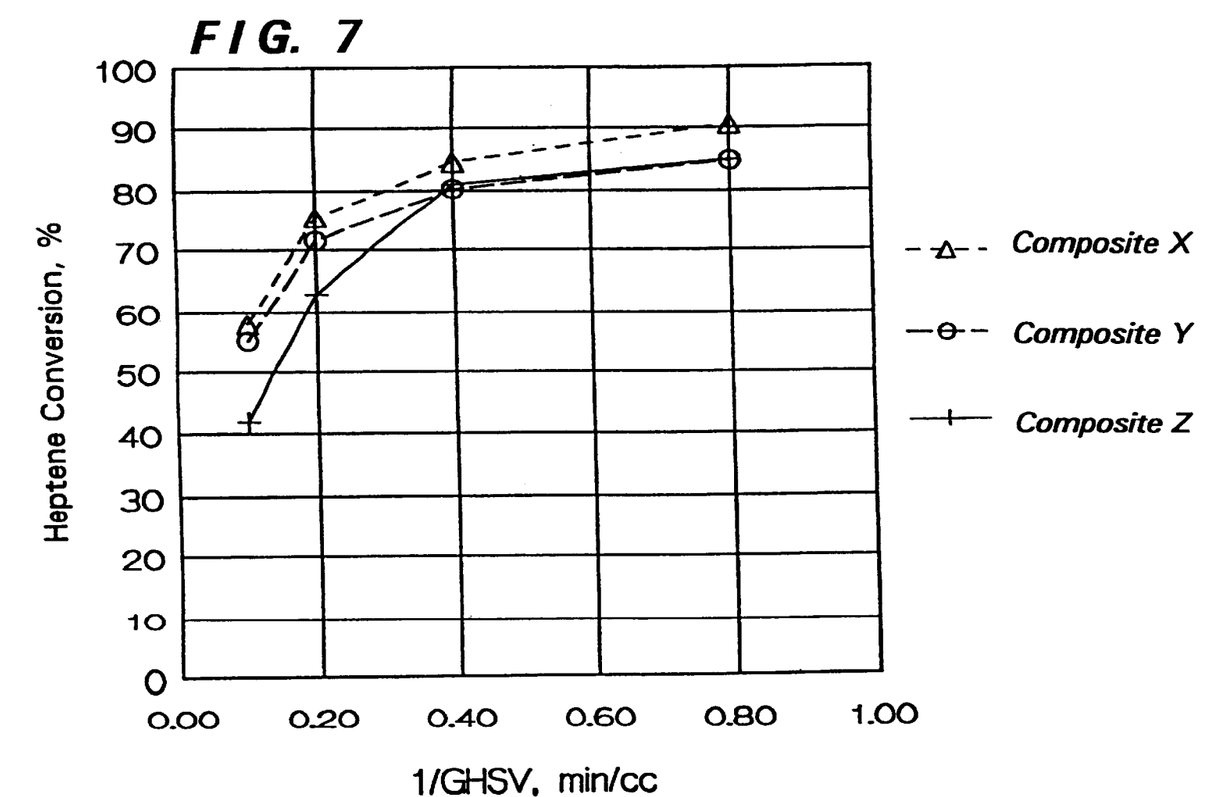
FIG. 7 shows conversion of heptene as a function of space velocity for the composites of FIGS. 5 and 6 and a catalyst of the known art.

Conversion of heptene over the three composites is compared in FIG. 7 as a function of GHSV. Composite X comprising cerium demonstrated the highest activity, with Composite Y generally showing equivalent or higher activity than the control.

Figure 8:
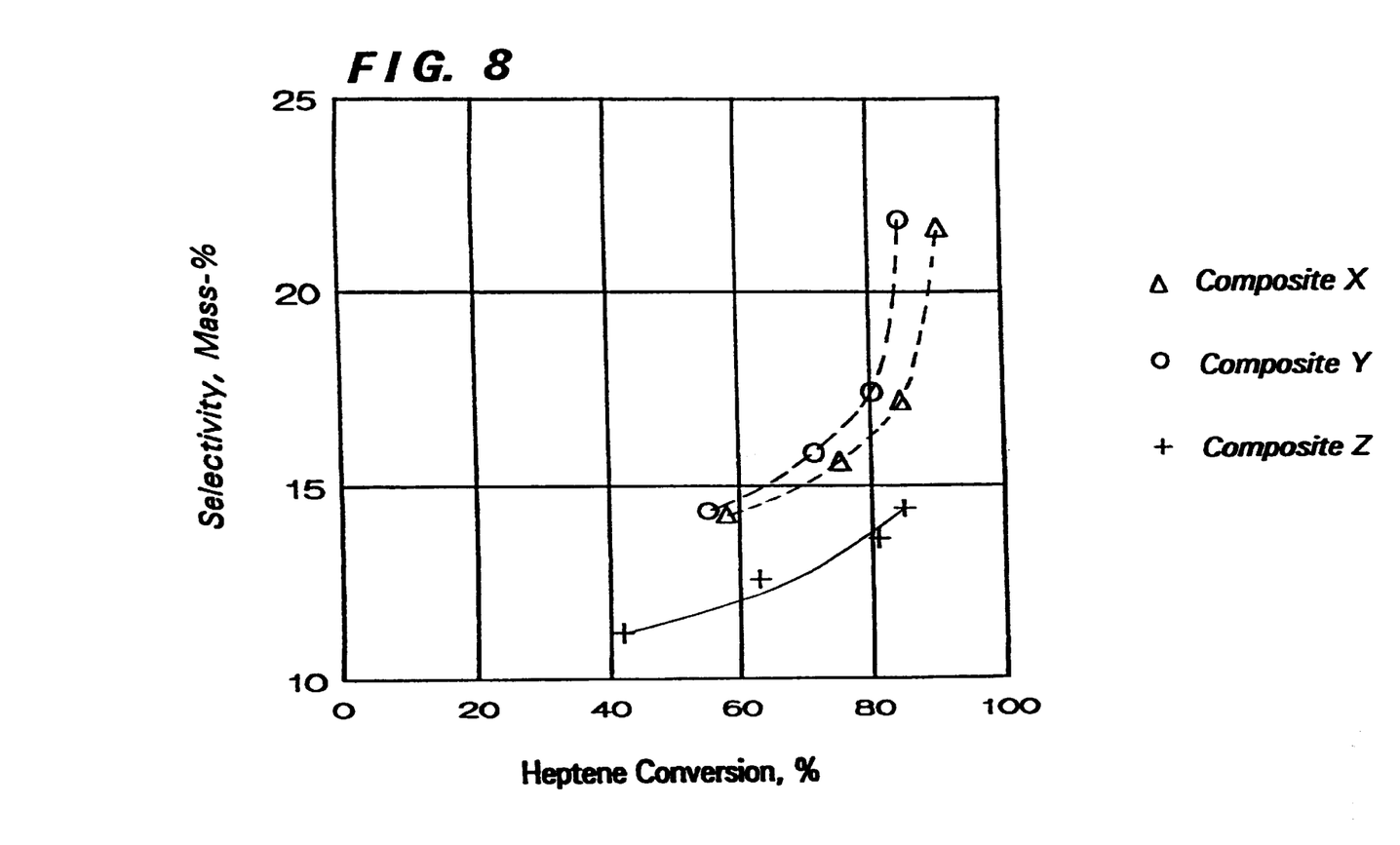
FIG. 8 shows selectivity to naphthenes and aromatics as a function of conversion of heptene consistent with the results of FIG. 7 for composites of the invention and of the known art.

FIG. 8 compares mass-% selectivity to naphthenes and aromatics related to heptene conversion. Composites X and Y of the invention both showed higher selectivity than the control, with Composite Y demonstrating the highest selectivity.

We claim:

1. A process for the catalytic reforming of a hydrocarbon feedstock which comprises contacting the feedstock with a catalyst having a particle diameter of between about 0.7 and about 3.5 mm and comprising a combination of a refractory inorganic oxide support with a multimetallic, multigradient metal component comprising about 0.01 to 2 mass-% on an elemental basis of a platinum-group-metal component, about 0.01 to 5 mass-% on an elemental basis of a homogeneously dispersed Group IVA (IUPAC 14) metal component and about 0.05 to 5 mass-% on an elemental basis of a surface-layer cerium component at reforming conditions to obtain an aromatics-enriched product.

2. The process of claim 1 wherein the hydrocarbon feedstock comprises a naphtha feedstock.

3. The process of claim 1 wherein the reforming conditions comprise a temperature of about 315° to 600° C., a pressure of about 100 kPa to 7 MPa (abs), and a liquid hourly space velocity of about 0.1 to 20 $hr^{-1}$.

4. The process of claim 3 wherein the reforming conditions further comprise a mole ratio of free hydrogen to hydrocarbon feed of about 1 to 20.

5. The process of claim 1 wherein the concentration of the cerium component in a 100-micron surface layer of particles of the catalyst is at least about twice the concentration of the cerium component in the central core of the particles.

6. The process of claim 5 wherein the concentration of the cerium component in a 100-micron surface layer of particles of the catalyst is at least about three times the concentration of the cerium component in the central core of the particles.

7. The process of claim 1 wherein the multigradient metal component consists essentially of components of platinum, tin and cerium.

* * * * *